Dec. 8, 1970 H. J. SHEETZ ET AL 3,546,075

EXPANDABLE METAL STRUCTURE MAKING BY ETCHING

Filed March 23, 1967

INVENTORS
HARRY J. SHEETZ AND
ROBERT T. MOLLOY
BY Edward J. Norton
ATTORNEY

United States Patent Office 3,546,075

Patented Dec. 8, 1970

3,546,075

EXPANDABLE METAL STRUCTURE MAKING BY ETCHING

Harry J. Sheetz, Trenton, and Robert T. Molloy, South River, N.J., assignors to RCA Corporation, a corporation of Delaware Filed Mar. 23, 1967, Ser. No. 625,472

Int. Cl. C23f *1/02*

U.S. Cl. 156—8 4 Claims

ABSTRACT OF THE DISCLOSURE

This disclosure describes an expandable, thread-like, metal web structure of high packing density, and the method of making such structure by photomasking and etching.

The invention herein described was made in the course of or under a contract or subcontract thereunder with the Department of the Air Force.

Expandable metal web structures have been used in a number of varied applications. One use which is becoming increasingly important is in the field of communications where such structures have been employed as deployable antenna reflectors. The prior art teaches making expandable metal structures by cutting holes into metal sheets or in some other manner mechanically perforating metal sheets. Such a procedure becomes impractical when the perforations must be placed very close together to make a thread-like metal web structure possessing spring energy and possessing high density packaging. It has been found, in fact, that the mechanical procedures now available place definite limitations on the amount of packing density achievable.

It is an object of this invention to provide a novel thread-like expandable metal web structure having a packing density greater than that heretofore obtainable. A further object is to provide an improved method of providing such structures.

Briefly, the above objects are accomplished by first coating opposite surfaces of a suitable metal foil with photoresist material. A photoresist coated surface of the foil is exposed by a pattern formed according to the dimensions of the web structure desired. The exposed surface of the foil is then developed by passing the foil through a developing solution, whereby an arrangement of cells are provided in the photoresist material in accordance with the pattern employed. A protective backing is next provided over the other, unexposed, photoresist coated surface of the foil. The foil is sprayed with an etching solution to etch the foil away in the area of the cells formed in the photoresist material. The protective backing and the photoresist on the unexposed surface of the foil are then removed to provide the expandable structure. A web structure is provided having spring energy and capable of a packing density greater than previously obtainable.

A more detailed description of the invention will now be given in connection with the accompanying drawing, in which.

Figure 1:
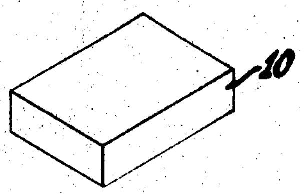
FIG. 1 illustrates a metal foil exaggerated in size for purposes of this description.
Figure 2:
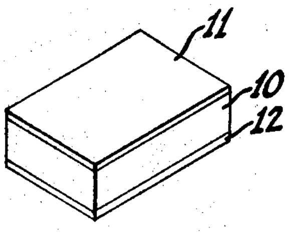
FIG. 2 illustrates the metal foil with a photoresist on opposite surfaces thereof.

In accordance with one embodiment of this invention, there is provided as shown in FIG. 1 a thin foil 10 of beryllium copper (BeCu) approximately 1 mil thick. In practice, the foil 10 may be from 1 mil to 10 mils thick. The foil 10 may by way of example contain approximately 97.8% copper, 0.3% cobalt and 1.9% beryllium. The foil 10 is first degreased by running the foil 10 through trichloroethylene vapor and is further cleaned by running the foil 10 through acetone. The foil 10 is then dried by passing it under infrared lamps. The foil 10 is next passed through a tank of photoresist material such as AZ111 made by Shipley Corporation, Boston, Mass. at the rate of 6 feet per minute. The foil 10 is then dried immediately under infrared lamps providing a layer 11 of photoresist material 11 on a first side of the foil 10 and a second layer 12 on a second opposite side of the foil 10 as shown in FIG. 2.

Figure 3:
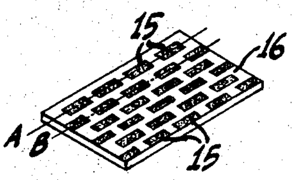
FIG. 3 illustrates a pattern formed on a Mylar sheet.

A pattern to be photoetched in the foil 12 may be provided, for example, by laying black tape 15 over a Mylar sheet 16 in the manner shown in FIG. 3. The portion of the Mylar 16 covered by the black tape 15 is, in this embodiment, the portion to be etched away to form the cells or voids 15' shown in FIG. 7. The portion of the uncovered Mylar 16 forms the strands 21 and the junction portions 22. The strips 15 of the black tape in one row A are arranged to be in staggered or break-joint parallel position relative to the strips of black tape in the adjacent row B, the strips 15 of the black tape in alternate rows being aligned. Other known techniques for providing the pattern of FIG. 3 may be used.

A photographic negative is made of the pattern shown in FIG. 3, and this photograph is then photoreduced (20 to 1, for example). A positive film of the original pattern is made from the negative. The positive film can be duplicated several times to form a much larger positive film by properly stepping the negative film through successive exposures so that a final positive film of the original pattern provided covers an area corresponding to the end structure desired, for example, an expandable radar reflector. The positive film is then placed over the photoresist coated surface 11 of the foil 10, FIG. 2, and exposed by two 275-watt ultraviolet lamps for 20 minutes, following standard photographic techniques.

Figure 4:
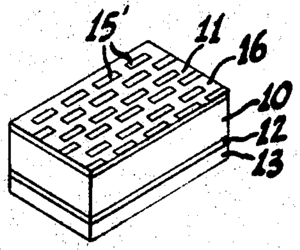
FIG. 4 illustrates the metal foil of FIG. 2 exposed on one of its photoresist coated surfaces to the pattern of FIG. 3.

FIG. 4 illustrates a section of the foil 10 with the exposed photoresist layer 11. The portion 15' corresponding to the tape portion 15 in FIG. 3 represents the unexposed portions of the photoresist layer 11. The foil 10 is then placed in a developing solution for the photoresist such as AZ300 made by Shipley Corporation using one part AZ300 photoresist to five parts water. The foil 10 remains in the solution for about six minutes and hardens the exposed portions 16' of the photoresist material as shown in FIG. 4 in a manner to make the portions 16' acid resistent, leaving the unexposed portions 15' of the photoresist layer 11 susceptible to an etchant. It is noted that, since the photoresist layer 12 on the opposite side of the foil 10 has not been exposed, it also remains susceptible to an etchant. A protective and holding backing 13 is, as shown in FIG. 4, then placed over the photoresist layer 12. In this embodiment, the protective and holding backing 13 is provided by a piece of No. 2 treated, black electrical tape made by Minnesota Mining and Manufacturing Corporation.

Figure 5:
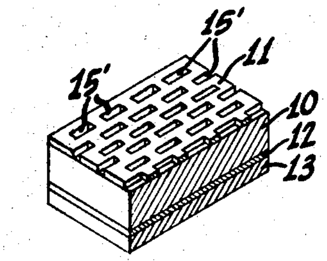
FIG. 5 illustrates the metal foil with the etch resistant photoresist areas on the exposed surface thereof following developing.
Figure 6:
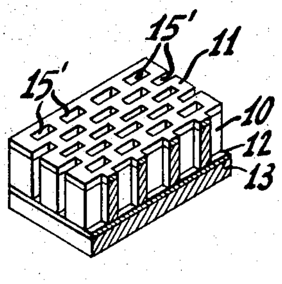
FIG. 6 illustrates the metal foil after being etched.

The foil 10 as shown in FIG. 4 is passed through an etching spray such as chromic sulfuric acid (pH about 1). The acid is at a temperature of about 120° F. and is sprayed at a pressure of about 20 pounds per square inch to the foil 10. The etching solution passes through the portions 15' of photoresist layer 11 to the foil 10 as suggested in FIG. 5. The etching solution etches through the portion of the foil 10 unprotected by the previously exposed and hardened photoresist portion 16' of layer 11, leaving only the foil 10 in the desired unexpanded pattern with the series of voids 15' in one row in parallel break-joint position to the series of voids 15' in the adjacent row. Little or no etching takes place through the back side of the foil 10 during the etching process because of the protective tape barrier 13 and the photoresist coating 12 as seen in FIG. 6. It is believed that the presence of the photoresist layer 12 serves to deter the etching solution, having acted from the layer 11 down through the foil 10, from acting on the portion 16' at the bottom of the foil 10, thus, tending to concentrate the action of the etching solution to that which occurs through the layer 11. The protective tape barrier 13 can also serve as a holder for holding the foil 10 while being etched.

The foil 10 is then rinsed in water, and the tape barrier 13 is removed. The remaining photoresist 11 and 12 is removed by placing the foil 10 in acetone for about 15 to 20 minutes. The foil 10 is placed again in an acetone cleaning bath for about three minutes to assure cleanliness. As shown in FIG. 6, the foil 10 is characterized by a pattern of very fine slits therein. The slits in one row A are offset with respect to the slits in the adjacent row B, the slits in alternate rows being aligned with one another.

The metal structure formed in the manner described can now be employed as desired. For example, the web structure can be assembled into an antenna reflector by placing suitable metal strips along the metal web structure. The metal strips can be constructed and attached to the web structure so that a suitable means, for example, a torsion spring, acts on the strips and through the strips on the web structure to erect the reflector and hold it erect.

The illustrations provided in the drawing in no way reflect actual dimensions intended which are exaggerated for purposes of explanation.

Figure 7:
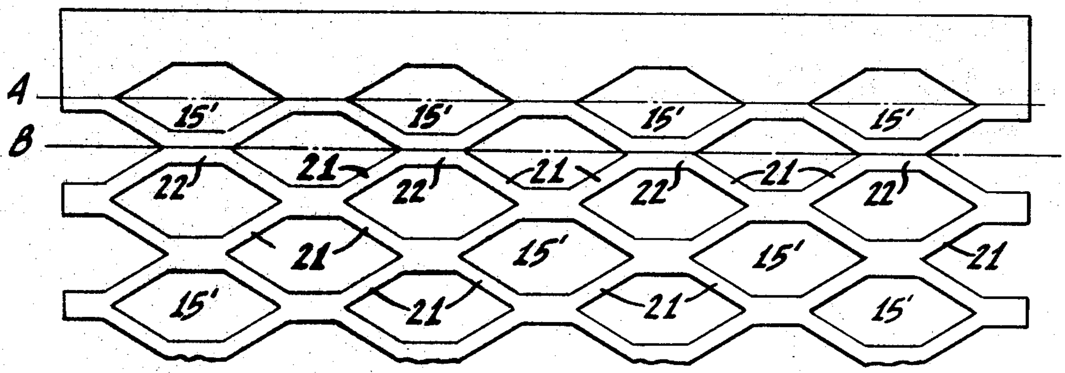
FIG. 7 illustrates an expanded thread-like metal web structure according to one embodiment of this invention.

FIG. 7 shows an expanded foil web-like structure as provided by this invention. The strands 21 and the junctions 22 delimit the cells or voids 15'. The hexagonal form of the cells or voids 15' are in parallel rows whose main axis is normal to the junction portions 22 of the adjacent rows. The junction portions 22 are provided by the foil material which lies between the ends of the adjacent voids 15' of each row and between the aligned voids of the alternate rows. The strands 21 formed in accordance with the described embodiment and useable, for example, as an antenna reflector can be approximately 1 to 10 mils thick, approximately 0.004 of an inch wide, and approximately 0.72 of an inch in length. The voids 15 before being expanded in the manner show in FIG. 7 can be approximately 0.004 of an inch wide. As is illustrated the voids are not hexagonal cutouts but are more like very fine slits that are closely placed together, the act of expanding the web serving to produce the hexagonal shape of the voids. Many patterns may be formed in accordance with these teachings to provide the particular thread-like metal web structural pattern desired.

What is claimed is:

1. The method of making an expandable thread-like metal structure having spring energy from a metal foil comprising the steps of coating a surface of said foil with a photoresist material, forming an exposed pattern on said surface characterized by rows of narrow elongated cells closely spaced to each other so as to form thread-like spacing between said cells, said exposed pattern being characterized by the cells on one of said rows in break-joint parallel position relative to the cells of the adjacent rows and so that the cells in alternate rows are aligned, immersing said foil in a photoresist developing solution to render said material etch resistant except in in the area of said cells, applying an etching solution to said foil to etch away said foil in the area of said cells to form slits in said foil corresponding to said cells, and removing any remaining photoresist material.

2. The method in accordance with claim 1 wherein said foil is an alloy containing copper and beryllium 1 to 10 mils thick.

3. The method of making an expandable thread-like metal web structure having spring energy from a metal foil comprising the steps of coating both surfaces of a metal foil with a photoresist material, placing a film pattern over one coated surface of said foil characterized by parallel rows of opaque relatively thin elongated narrow lines closely spaced to each other with the opaque lines of one row in break-joint position relative to the opaque lines in the adjacent rows so that said opaque lines in alternate rows are aligned, exposing said one coated surface having said pattern placed thereover to light, immersing said foil in a photoresist developing solution to harden and render resistant to etching the exposed area of said material other than that corresponding to said lines on said one coated surface, placing a protective barrier over the second coated surface of said foil, spraying said foil with an etching solution to form narrow slits in said foil corresponding in position to that of said opaque lines, and removing said protective barrier and any remaining photoresist material to provide said expandable thread-like metal structure.

4. An expandable thread-like metal web structure having spring energy made in accordance with the method defined in claim 1.

References Cited

UNITED STATES PATENTS

| | | | |
|---|---|---|---|
| 297,382 | 1884 | Golding | 113—116 A |
| 2,536,383 | 1/1951 | Mears et al. | 156—11 XR |
| 3,279,043 | 10/1966 | Wirt | 156—3 XR |
| 3,423,261 | 1/1969 | Frantzen | 156—11 |

FOREIGN PATENTS

| | | | |
|---|---|---|---|
| 845,832 | 8/1960 | Great Britain | 156—11 |

JACOB H. STEINBERG, Primary Examiner

U.S. Cl. X.R.

29—163., 180, SS; 113—116A; 156—11